(12) United States Patent
Evertsz et al.

(10) Patent No.: US 7,787,677 B2
(45) Date of Patent: Aug. 31, 2010

(54) PRESENTATION METHOD, PRESENTATION DEVICE AND COMPUTER PROGRAM FOR PRESENTING AN IMAGE OF AN OBJECT

(75) Inventors: Carl J. G. Evertsz, Bremen (DE); Anke Bödicker, Bremen (DE)

(73) Assignee: MeVis BreastCare GmbH & Co. KG, Bremen (DE)

( * ) Notice: Subject to any disclaimer, the term of this patent is extended or adjusted under 35 U.S.C. 154(b) by 985 days.

(21) Appl. No.: 11/465,074

(22) Filed: Aug. 16, 2006

(65) Prior Publication Data
US 2008/0044067 A1 Feb. 21, 2008

(51) Int. Cl.
G06K 9/00 (2006.01)
A61B 6/00 (2006.01)

(52) U.S. Cl. .................. 382/128; 382/201; 378/24

(58) Field of Classification Search ........... 382/103, 382/106, 128, 129, 130, 131, 132, 133, 134, 382/168, 178, 181, 194, 199, 201, 203, 219, 382/232, 274, 276, 282, 286, 288, 291, 305; 378/9, 23, 24
See application file for complete search history.

(56) References Cited

U.S. PATENT DOCUMENTS

| | | | |
|---|---|---|---|
| 5,872,828 A * | 2/1999 | Niklason et al. | 378/23 |
| 6,075,879 A | 6/2000 | Roehrig et al. | |
| 7,016,455 B2 * | 3/2006 | Bruder et al. | 378/9 |
| 7,519,212 B2 * | 4/2009 | Brady et al. | 382/132 |
| 2001/0043729 A1 | 11/2001 | Giger et al. | |
| 2003/0227468 A1 | 12/2003 | Takeda | |
| 2005/0010445 A1 | 1/2005 | Krishnan et al. | |
| 2005/0069184 A1 * | 3/2005 | Kasai | 382/128 |
| 2006/0164511 A1 | 7/2006 | Krupnik | |
| 2006/0274928 A1 | 12/2006 | Collins et al. | |
| 2007/0274585 A1 * | 11/2007 | Zhang et al. | 382/132 |

OTHER PUBLICATIONS

Zhou, C. et al., "Computerized Nipple Identification for Multiple Image Analysis in Computer-Aided Diagnosis," Medical Physics, vol. 31, No. 10, Oct. 2004, pp. 2871-2882.*
U.S. Appl. No. 11/465,078, filed Aug. 16, 2006, entitled "Method, Apparatus and Computer Program for Presenting Cases Comprising Images," inventor: Carl J. G. Evertsz et al.
U.S. Appl. No. 11/465,386, filed Aug. 17, 2006, entitled "Method, Apparatus and Computer Program for Displaying Mark in an Image Data Set," inventor: Carl J. G. Evertsz et al.

* cited by examiner

*Primary Examiner*—Seyed Azarian
(74) *Attorney, Agent, or Firm*—Black Lowe & Graham PLLC

(57) ABSTRACT

A presentation method and a presentation device presents an image of an object, wherein a starting image and at least one target image of the object, a first location within the starting image, and a second location within the starting image and the at least one target image are provided. The second location is the location of a reference feature detectable in the starting image and the at least one target image. A corridor is determined in the at least one target image, wherein the corridor contains a circular line, wherein the circular line defines a circle, whose radius corresponds to a distance between the first location and the second location in the starting image and whose centre position corresponds to said second location. Finally, the corridor and the at least one target image are presented.

16 Claims, 4 Drawing Sheets

Figure 1:
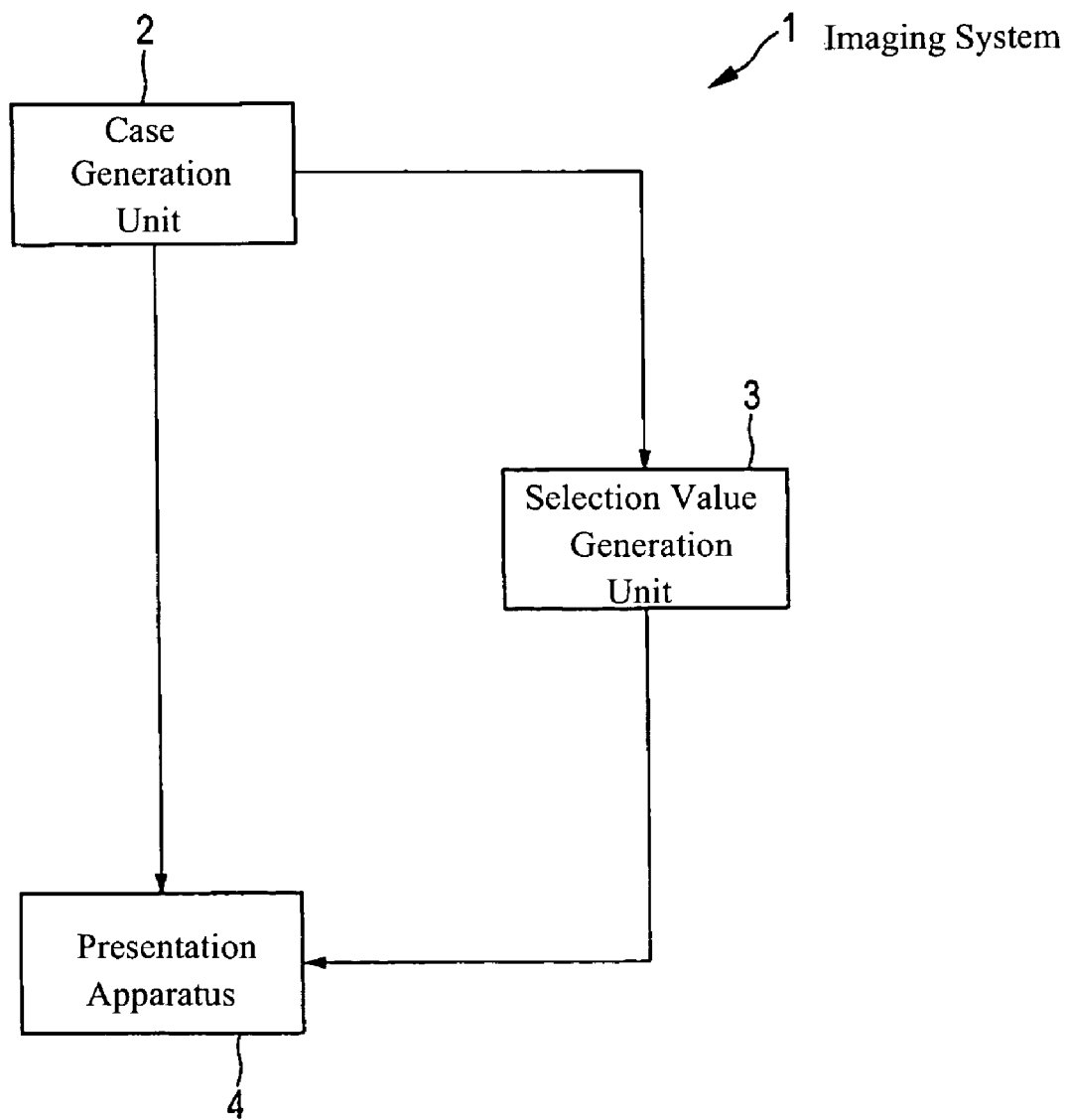

PRESENTATION METHOD, PRESENTATION DEVICE AND COMPUTER PROGRAM FOR PRESENTING AN IMAGE OF AN OBJECT

TECHNICAL FIELD

This disclosure generally relates to a presentation method, a presentation device and a computer program for presenting an image of an object. This disclosure generally relates further to an imaging system comprising an image generation device and a presentation device for presenting an image of an object.

BACKGROUND INFORMATION

A set of several images of the same object can, for example, be obtained by an image generation unit, like a computed tomography device, a magnetic resonance imaging device, an ultrasound device, a mammography device or any other medical imaging device. A user, like a radiologist, often marks a region within one of these images, being a starting image, and wants to see regions, which correspond to the marked region, in at least one of the other images being target images. For example, the image generation device can be a digital mammography device. In mammography each breast is generally imaged twice, wherein a first image is a craniocaudal view image (CC) and wherein a second image is a mediolateral oblique view image (MLO). Therefore, in this example, at least four images are acquired, a right MLO image, a left MLO image, a right CC image and a left CC image. Also more images can be present, for example, images of prior digital mammography examinations or other projections. If a user, in this example, a radiologist, marks a suspicious region in one of these images, being a starting image, the user generally wants to see the corresponding regions in the other mammograms being target images. Radiologists try to find corresponding regions in different images manually, which is inaccurate and/or subject to inter observer variability and can therefore lead to a misassessment of a suspicious region.

BRIEF SUMMARY OF THE INVENTION

Embodiments of the present invention provide a presentation method, a presentation device and a computer program for presenting an image of an object, which assist a user in finding corresponding regions in different images of the same object.

Embodiments of the present invention further provide a presentation method, a presentation device and a computer program for presenting an image of an object, which assist a user in finding corresponding regions in different images of the same object with low computational effort.

In a first aspect of the present invention a presentation method for presenting an image of an object is presented, comprising the steps of:

providing a starting image and at least one target image of said object, providing a first location within said starting image, providing a second location within said starting image and said at least one target image, being the location of a reference feature detectable in said starting image and in said at least one target image, determining a corridor in said at least one target image, wherein said corridor contains a circular line, wherein the circular line defines a circle, whose radius corresponds to a distance between said first location and said second location in said starting image and whose centre position corresponds to said second location, presenting said corridor and said at least one target image.

In the starting image and/or in the at least one target image, the object can be deformed, and in each or in some of these images the deformation of the object can be different. Furthermore, the starting image and/or the at least one target image can be a two-dimensional image, like a absorption or transmission projection, for example, a CC image or a MLO image of a breast, or a three-dimensional image, like a three-dimensional computed tomography image or a three-dimensional magnetic resonance image. For example, the starting image and the at least one target image can be two-dimensional images, or one of these images, the starting image or the at least one target image, can be a two-dimensional image, and another image of these images can be a three-dimensional image.

The first location and the second location can be an image point or an extended region within the respective image. Furthermore, since in different images the object can comprise different deformations and can be imaged from different directions, the shape of the first location and/or the second location can differ from image to image. For example, a location, being in the starting image an image point, can be a line in the at least one target image.

The distance between the first location and the second location is preferentially in one embodiment the distance between the centres of these locations. But, the distance can also be any distance between a point at or within the first location and a point at or within the second location.

The circular line can be a complete circular line, e.g., a line forming a circle, or a circular segment line, e.g., a line being a segment of a circle. The circular line is preferentially not displayed in one embodiment, e.g. it is preferentially virtual circular line only in one embodiment. The corridor is therefore preferentially in one embodiment formed substantially like a ring or like a segment of a ring containing a complete circular line or a circular segment line, respectively.

The centre position of the circle defined by the circular line, e.g. the complete circular line or the circular segment line, is preferentially in one embodiment the centre of the second location in the at least one target image. Alternatively, the centre position of this circle can be any point at or within the second location within the at least one target image.

The circular line defines a circle, whose radius corresponds to the distance between the first location and the second location in the starting image. This means that this radius can be substantially equal to this distance, e.g., it is preferred in one embodiment that a difference length between this radius and this distance is smaller than 10 percent of this distance. It is further preferred in one embodiment that this difference length is smaller than 5 percent of this distance, and it is further preferred in one embodiment that this distance is equal to the radius. That the radius corresponds to the distance also means that, if the object in the at least one target image is magnifiedly shown with respect to the starting image of this object, this radius is substantially equal to an accordingly magnified distance. For example, if the object is magnified by a factor of two in the at least one target image relative to the starting image, the radius is substantially equal to twice a distance between the first location and the second location in the starting image. If the starting image and the at least one target image show the object with different magnifications, the difference between the radius and the accordingly magnified distance is preferentially in one embodiment smaller than 10 percent of the accordingly magnified distance, further preferred in one embodiment smaller than 5 percent of the accordingly magnified distance and further preferred in one embodiment equal to zero.

One embodiment of the invention is based on the idea that the first location in the starting image corresponds with a high probability to a region within the at least one target image, which is located within the corridor within the at least one target image. Therefore, the user, like a radiologist, can focus on the corridor, if the user wants to find a region within the at least one target image, which corresponds to the first location within the starting image. The determination of this corridor can be carried out with low computational effort.

This low computational effort is particularly important, if the user is a radiologist and if the images are medical images. A radiologist has to review a large number of medical images in a short time, for example, 200 images in two hours. It is therefore important to determine the corridors very fast, in order to not let a radiologist wait and waist his time.

It is preferred in one embodiment that said object is a breast, wherein said starting image and said at least one target image are medical diagnostic images of the breast, in particular, mammograms, wherein said reference feature is a nipple of a breast. The mammograms are preferentially in one embodiment a MLO or ML image and a CC image of the same breast. The deformation of the breast in a MLO or ML image is different to the deformation of the breast in a CC image. Furthermore, the breast in a MLO or ML image has been viewed from another direction than in a CC image. But, although the breast is viewed from different directions and deformed differently, the distance between the first location within the breast and the nipple of the breast being the second location is substantially invariant in the different mammographic views, e.g., this distance does not change very much. It exists therefore a high probability, that a region, which corresponds to a first location in a starting mammogram, is located within the corridor in at least one target mammogram. The presentation method of presenting an image of an object is therefore particularly applicable, if corresponding locations or regions have to be found in different mammograms of the same breast.

It is preferred in one embodiment that the step of providing a first location within said starting image comprises a step of providing an input unit for inputting said first location within said starting image. The input unit is, for example, a graphical user interface, like a dedicated window on a monitor, which allows a user to input the first location within the starting image via, for example, a mouse or a keyboard. For example, the starting image could be displayed on a display unit, like a monitor, and a user can mark a first location within the starting image by drawing a mark within the starting image, which can, for example, be a point or a line surrounding a region being the first location, by using a mouse pointer of a mouse. A user can, therefore, easily provide the first location within the starting image.

It is further preferred in one embodiment that the step of providing a first location within said starting image comprises a step of providing a CAD mark determined by using a CAD algorithm and a step of providing an input unit for selecting said CAD mark as said first location within said starting image.

Computer-aided-detection marks (CAD marks) can be determined by known CAD computer programs and CAD devices, which are, for example, the Image Checker System produced by R2 Technology Inc. or the Second Look Digital System produced by iCAD Inc.

CAD marks are used, in order to help a radiologist to find suspicious regions within a medical image, like a mammogram. A CAD mark marks a region within a mammogram, which is, with respect to the CAD algorithm used by a CAD computer program and/or a CAD device, suspicious of marking an illness, in particular, of marking cancer. The input unit can be any graphical user interface, which allows a user to select a certain CAD mark. Preferentially in one embodiment, a user can select a CAD mark by clicking on the respective CAD mark with a mouse pointer. This allows a user to easily select a CAD mark and to review regions, which correspond to the selected CAD mark, in the at least one target image.

A CAD mark can, for example, be a mass mark, a microcalcification mark, a calcified mass mark, or a breast density mark.

It is further preferred in one embodiment that the step of providing said second location within said starting image and said at least one target image comprises a step of automatically detecting said second location in at least one of said starting image and said at least one target image. The automatic detection of the second location allows to automatically determine and display the corridor in the at least one target image, after a first point has been provided in the starting image. Therefore, in this embodiment, the corridor can displayed in the at least one target image immediately after the provision of the first location without requiring a further interaction with the user.

It is further preferred in one embodiment that the step of providing said second location within said starting image and said at least one target image comprises a step of providing an input unit for inputting said second location within said starting image and said at least one target image. The input unit, for example, a graphical user interface, allows a user to input the second location in the starting image and/or in at least one of the at least one target image. The second location can preferentially be provided in one embodiment within an image by clicking with a mouse pointer on the respective location within the respective image. This allow a user to easily provide the second location in at least one of the starting image and the at least one target image.

It is further preferred in one embodiment that the step of providing said second location within said starting image and said at least one target image comprises a step of providing an input unit for correcting the position of said second location at least within one of said starting image and said at least one target image. The input unit is, for example, a graphical user interface, which allows a user, for example, by using a drag-and-drop operation, to move the second location to another position within the respective image. This allows a user to easily modify the position of a second location which has been provided, for example, by an automatic second location detection system. Such a system is, for example, a nipple detection system using a nipple detection computer program for detecting the nipple of a breast automatically. Such a system is, for example, disclosed in Zhou C, Chan H P, Paramagul C, Roubidoux M A, Sahiner B, Hadjiiski L M, Petrick N, "Computerized nipple identification for multiple image analysis in computer-aided diagnosis", Med Phys. 2004 Oct., 31(10):2871-82.

It is further preferred in one embodiment that the presentation method for presenting an image of an object further comprises the step of providing an input unit for inputting said distance for providing said distance or the step of determining said distance between said first location and said second location in said starting image. Thus, preferentially in one embodiment a user can enter the distance between the first location and the second location in a presentation device for presenting an image of an object in accordance with the invention. For example, if the object is a breast and ultrasound and/or breast magnetic resonance imaging images are present, a user, like a radiologist, can determine the distance between a first location and a second location being the location of the nipple of the breast from the present ultrasound and/or breast magnetic resonance imaging images, and the user can enter this determined distance into the presentation device for presenting an image of an object in accordance with one embodiment of the invention. Thus, the distance between the first location and the second location has not to be determined within the starting image, but this distance can be provided by a user, who knows this distance, for example, from present images of the object, for example, of the breast. This present images can differ from the starting image and the at least one target image. For example, the starting image and the at least one target image can be digital mammograms acquired by a digital mammography device, and the present images, from which the user has determined the distance, can be an image from other modalities, like images from an ultrasound device, a magnetic resonance imaging device or a computed tomography device. However, in accordance with one embodiment of the invention, it is also possible that a user does not enter this distance in the presentation device for presenting an image of an object, but that this distance is determined by the presentation device for presenting an image of an object itself.

It is further preferred in one embodiment that said corridor is determined such that said circular line is located in the middle of said corridor. This leads to a corridor having a high probability of containing a region, which corresponds to the first position, in the at least one target image.

It is further preferred in one embodiment that said first location is extended and that the step of determining said corridor comprises following steps:
   determining the smallest distance and the largest distance between said second location and said extended first location within said starting image,
   determining said corridor such that it contains all image points of said at least one target image having a distance to said second location which is smaller than said largest distance and larger than said smallest distance. This further increases the probability of the corridor of containing a region, which corresponds to a first location within the starting image, within the at least one target image.

It is also preferred in one embodiment that an input unit is provided for inputting a width of said corridor being sufficient to contain all image points of said at least one target image having a distance to said second location which is smaller than said largest distance and larger than said smallest distance. The input unit is preferentially in one embodiment a graphical user interface, which allows a user to input a width of the corridor, which is sufficient to contain all image points of the at least one target image having a distance to the second location, which is smaller than the largest distance and larger than the smallest distance. This allows a user to modify the width of the corridor, thus, to further increase the probability of the corridor of containing a region, which corresponds to a first location within the starting image, within the at least one target image by increasing the width of the corridor.

It is further preferred in one embodiment that an input unit is provided for inputting a width value or that a width value is predefined, wherein said corridor is determined such that it contains all image points of said at least one target image having a distance to said second location which is smaller than said largest distance multiplied by the sum of one and the width value and larger than said smallest distance multiplied by the difference between one and the width value. The input unit for inputting a width value is preferentially in one embodiment a graphical user interface, which allows a user to input a width value, for example, via a keyboard or a mouse. Since, in this embodiment, the width depends on a fraction of the largest distance and a fraction of the smallest distance, the width of the corridor depends on the distance between the first location and the second location and, thus, a useable width of the corridor can easily be inputted by a user. The width value can also be predefined. If the width value is predefined, the input unit for inputting a width value does not have to be provided. A preferred width value is 25 percent in one embodiment. It is further preferred in one embodiment that the part of said at least one target image, which is located inside of said corridor, is presented more prominent than the part of said at least one target image which is located outside of said corridor. Since the part of the at least one target image, which is located inside of the corridor, is presented more prominent than the part of the at least one target image, which is located outside of the corridor, the user, like radiologist, is focused on the corridor and not distracted by the part of the at least one target image located outside of the corridor. This further increases the assistance of finding corresponding regions in different images.

The part of the at least one target image, which is located outside of the corridor is preferentially shown less prominent by dimming this part in one embodiment. The dimming is preferentially carried out in one embodiment such that the user can still see the outline of the object, in particular, of the breast, in the dimmed part, and that the user can easily focus on the corridor. The dimming is preferentially performed in one embodiment by decreasing the brightness. Alternatively, only the part of the at least one target image can be shown, which is located inside of the corridor, e.g., the part of the at least one target image, which is located outside of the corridor, is, in this embodiment, not shown.

In a further aspect of the present invention a presentation device for presenting an image of an object is presented, said presentation device being provided with a starting image and at least one target image of said object, comprising:
   a determination unit adapted for
   determining a corridor in said at least one target image, wherein said corridor contains a circular line, wherein the circular line defines a circle, whose radius corresponds to a distance between a first location provided within said starting image and a second location provided within said starting image and said at least one target image, wherein said second location is the location of a reference feature detectable in said starting image and in said at least one target image, and whose centre position corresponds to said second location,
   a display unit adapted for presenting said corridor and said at least one target image,
   wherein the presentation device is adapted for carrying out the presentation method as claimed in one of the claims 1 to 13.

In a further aspect of the present invention an imaging system is presented, comprising:
   an image generation device for generating a starting image and at least one target image of an object,
   a presentation device for presenting an image of an object as claimed in claim 14, said presentation device being provided with said starting image and said at least one target image of said object, wherein said imaging system is adapted for:
   generating a starting image and at least one target image of an object,
   determining a corridor in said at least one target image, wherein said corridor contains a circular line, wherein the circular line defines a circle, whose radius corresponds to a distance between a first location provided within said starting image and a second location provided within said starting image and said at least one target image, wherein said second location is the location of a reference feature detectable in said starting image and in said at least one target image said distance, and whose centre position corresponds to said second location, presenting said corridor and said at least one target image.

In a further aspect of the present invention a computer program for presenting an image of an object is presented, comprising program code means for causing a computer to carry out the steps of the method as claimed in claim 1 when said computer program is carried out on a computer controlling the presentation device as claimed in claim 14.

It shall be understood that the presentation method of claim 1, the presentation device of claim 14, and the computer program of claim 16 have corresponding embodiments as defined in the dependent claims.

BRIEF DESCRIPTION OF THE SEVERAL
VIEWS OF THE DRAWINGS

Figure 2:
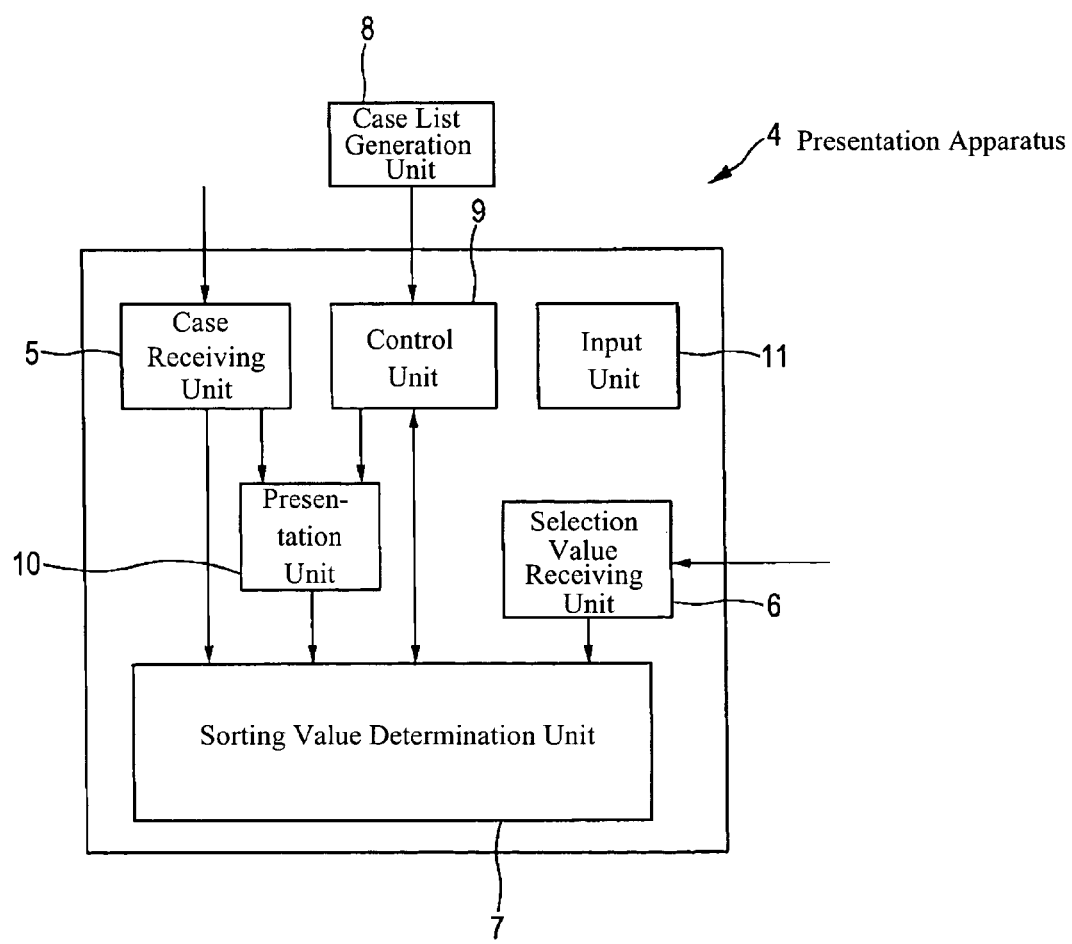
Figure 3:
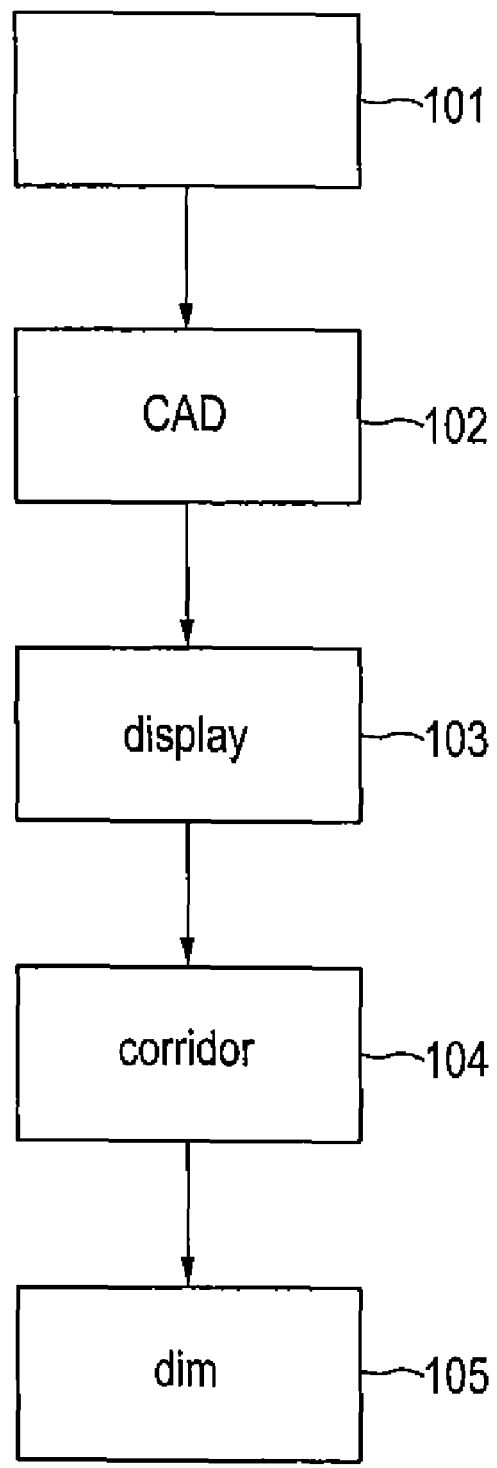
Figure 4:
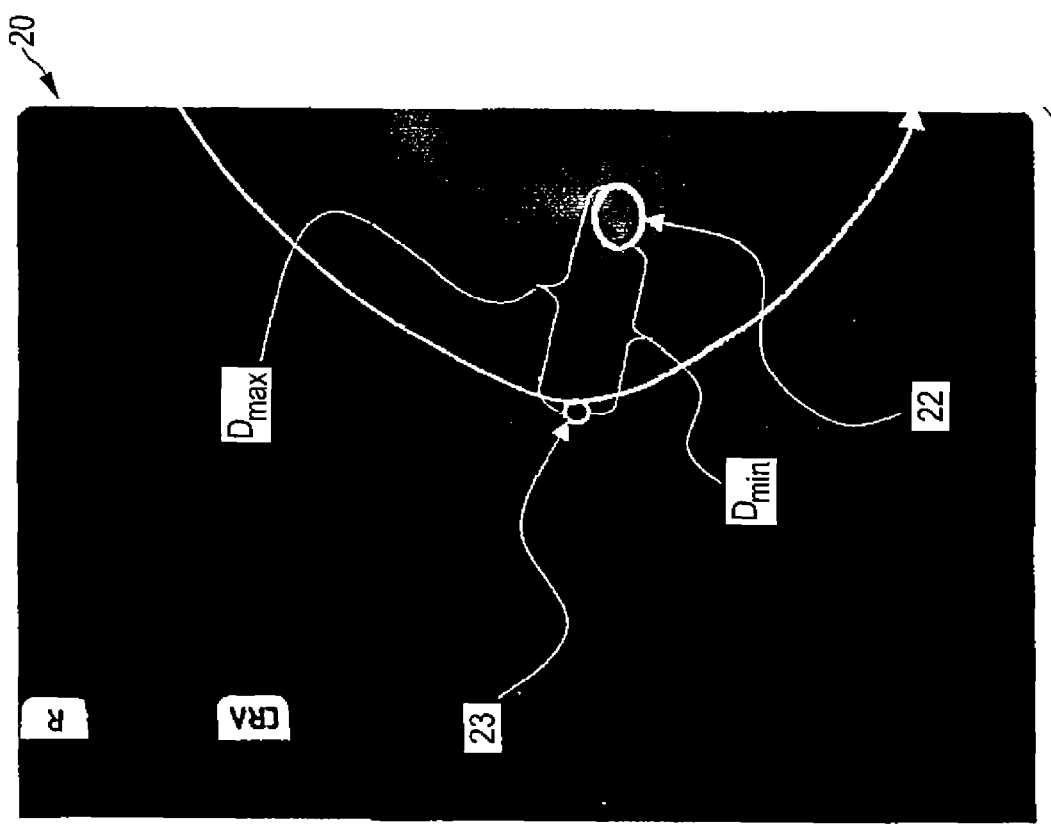
Figure 4:
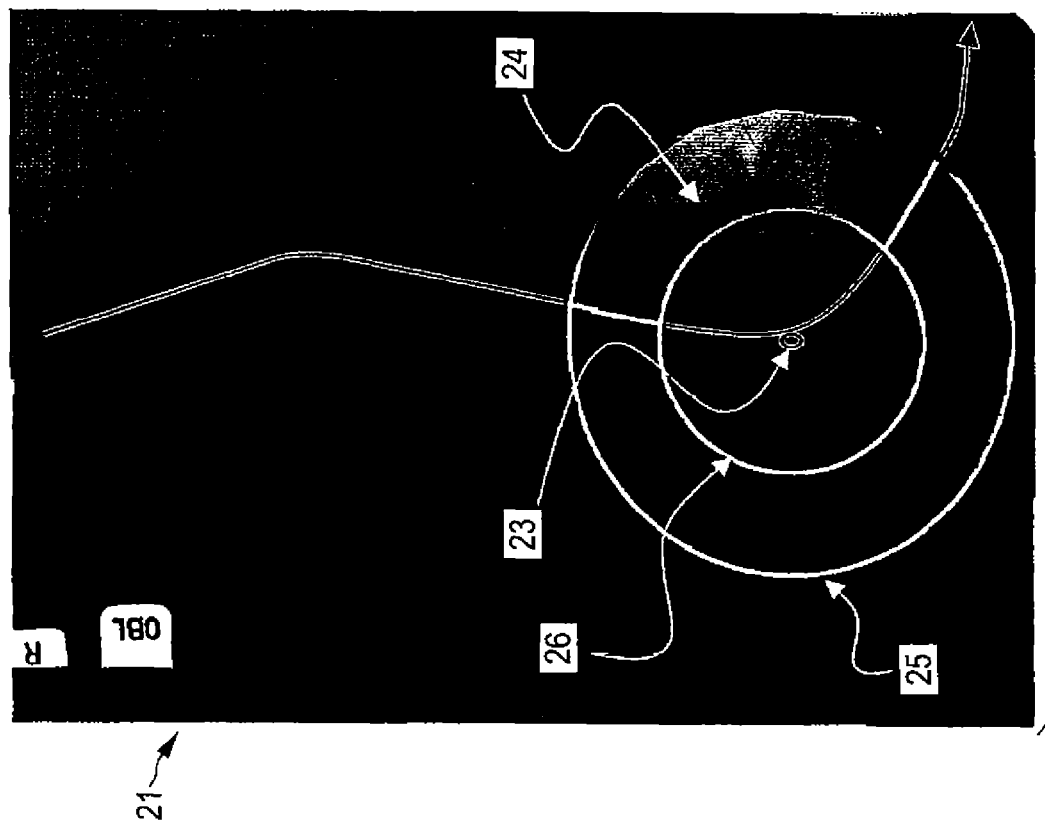

These and other aspects of the invention will be apparent from and elucidated with reference to the non-limiting and non-exhaustive embodiment(s) described hereinafter. In the following drawings:

FIG. 1 shows schematically an embodiment of an imaging system in accordance with the invention, FIG. 2 shows schematically an embodiment of a presentation device for presenting an image of an object in accordance with the invention, FIG. 3 shows a flowchart of one embodiment of a presentation method for presenting an image of an object in accordance with the invention, and FIG. 4 shows exemplarily a CC image and a MLO image of breast.

DETAILED DESCRIPTION OF EMBODIMENTS

In the following description, numerous specific details are given to provide a thorough understanding of embodiments. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the claimed invention.

FIG. 1 shows schematically an imaging system 1 comprising an image generation unit 2, a CAD mark generation unit 3 and a presentation device 4 for presenting an image for an object. The image generation unit 2 is, for example, a computed tomography device, a magnetic resonance device, an ultrasound device, a mammography device, in particular, a digital mammography device or any other medical imaging device. The image generation unit 2 generates images of an object, for example, digital mammograms of a breast, and transfers them to the CAD mark generation unit 3 and the presentation device 4. The CAD mark generation 3 unit is preferentially in one embodiment a CAD device and/or a CAD computer program generating a DICOM Structure Report (SR), which is defined in the DICOM standard and which contains CAD marks of the respective image. The SR is, for example, disclosed in Digital Imaging and Communications in Medicine (DICOM) 2006, published by the ACR (the American College of Radiology) and the NEMA (the National Electrical Manufacturers Association).

CAD marks are marks within the respective image indicating locations, which are suspicious of marking an illness, in particular, of marking cancer.

The CAD marks are transferred from the CAD mark generation unit 3 to the presentation device 4, e.g., in this embodiment, the SRs are transferred from the CAD mark generation 3 to the presentation device 4.

The imaging system 1 is, in accordance with the invention, not limited to the use of a CAD mark generation unit 3. Therefore, in another embodiment of the imaging system the CAD generation unit is not present.

FIG. 2 shows schematically an embodiment of the presentation device 4 in more detail.

The presentation device 4 comprises an image receiving unit 5 for receiving the images from the image generation unit 2 and a CAD mark receiving unit 6 for receiving CAD marks from the CAD mark generation unit 3. The images and the CAD marks can be transferred to and displayed on a display unit 7. The display unit 7 is preferentially in one embodiment at least one monitor for displaying images, in particular, for displaying digital mammograms.

The presentation device 4 further comprises a keyboard and/or a mouse 8, which can interact with a graphical user interface 9, in order to allow a user to enter inputs into the presentation device 4. These inputs can, for example, be a first location within a starting image and second locations within the starting image and within at least one target image.

The presentation device 4 further comprises a determination unit 10, which is adapted for determining a distance between a first location provided within a starting image and a second location provided within the starting image, wherein said second location is the location of a reference feature, preferentially of a nipple of a breast in one embodiment, detectable in the starting image and in the at least one target image. The determination unit 10 is further adapted for determining a corridor in the at least one target image, wherein the corridor contains a circular line, wherein the circular line defines a circle, whose radius corresponds to the distance between the first location and the second location and whose centre position corresponds to the second location. The determined corridor can be transferred to the display unit 7 for displaying the corridor within the at least one target image on the display unit 7.

The presentation device 4 further comprises a control unit 11, which is adapted for controlling the image receiving unit 5, the CAD mark receiving unit 6, the display unit 7, the graphical user interface 9 and the determination unit 10 preferentially in accordance with one embodiment of a presentation method for presenting an image of an object in accordance with the invention.

The presentation device 4 is preferentially a computer system in one embodiment, and the image receiving unit 5 and the CAD mark receiving unit 6 are preferentially program code means and/or dedicated hardware in one embodiment. The determination unit 10 and the control unit 11 can be realized by program code means and/or dedicated hardware.

The presentation device in accordance with one embodiment of the invention is not limited to the distribution of the functionalities of the presentation device on the different units as described with reference to FIG. 2. For example, the image receiving unit 5 and the CAD mark receiving unit 6 can be realized in one single unit receiving both, the images and the CAD marks. Furthermore, if, in an embodiment, the imaging system does not comprise a CAD mark generation unit 3, the CAD mark receiving unit 6 has not to be present. Furthermore, the presentation device can be used as a standalone system, which is not connected to an image generation unit 2. In this case, the presentation device 4 can receive the images and/or marks, in particular, CAD marks, and/or the second locations of an external image data base, or the presentation device 4 can comprise this image data base for providing images and/or marks, in particular, CAD marks, and/or the second locations.

An embodiment of a presentation method for presenting an image of an object in accordance with the invention will now be described in more detail with respect to a flowchart shown in FIG. 3.

In step 101 the image generation unit 2 generates images, for example, a digital mammography device generates CC and MLO images of a breast, and these images are transferred from the image generation unit 2 to the CAD mark generation unit 3 and the presentation device 4. In step 102 the CAD mark generation unit 3 generates CAD marks and transfers them to the presentation device 4. In other embodiments, step 102 can be omitted.

If the images are already present on the presentation device 4, step 101 can be omitted.

In step 103 the images and the CAD marks are presented on the display unit 7, e.g., in this embodiment, on one or several monitors.

In step 104 a corridor is determined, after a user has inputted or marked a first location within the starting image. The starting image can be any image of the images of the same object, which are present on the presentation device 4. For example, the CC image 20, which is exemplarily shown in FIG. 4, can be the starting image and a MLO image 21 of the same breast, which is exemplarily shown in FIG. 4, can be the target image. The first location 22 within the starting image 20 can be inputted to the presentation device 4 by using the graphical user interface 9 and the keyboard or mouse 8. For example, the first location 22 can be an ellipse or a circle, a line or any other region, which has been marked by a user. Furthermore, the presentation device 4 can be adapted to allow a user to select a CAD mark as a first location within the starting image 20. Before determining the corridor, second locations within the starting image and within the target image are provided, wherein the second location is the location of a reference features detectable in the starting image 20 and in the target image 21. In this embodiment, the second location is the location 23 of the nipple in the starting image 20 and in the target image 21.

The location of the nipple can be detected by using an automatic nipple detection algorithm, which is, for example, disclosed in Zhou C, Chan H P, Paramagul C, Roubidoux M A, Sahiner B, Hadjiiski L M, Petrick N, "Computerized nipple identification for multiple image analysis in computer-aided diagnosis", Med Phys. 2004 Oct. 31(10):2871-82.

Alternatively, if the second location is not automatically detected, the presentation device 4 is adapted such a user can input the second location in each of the images of the respective object via a graphical user interface and, for example, a keyboard or a mouse.

It is also preferred in one embodiment that the second locations are automatically detected and that a user can correct the positions of the second locations by using a graphical user interface and, for example, a keyboard or a mouse. For example, a position of a second location can be corrected by a drag-and-drop operation applied to the mark marking the respective position of the second location.

As a further alternative, the positions of the second locations within the images can be provided from an external device, like a data base or a device for determining the positions of the second locations, which uses, for example, known nipple detection algorithms. The positions of the second locations, for example, the nipple positions can also be encoded in the SR and obtained from the SR.

In this embodiment, in order to determine the corridor 24, which could also be named corridor of interest, the largest distance $D_{max}$ from the second location to the first location and the smallest distance $D_{min}$ from the second location to the first location are determined. The largest distance $D_{max}$ is preferentially in one embodiment the distance between the centre of the second location 23 and the point at or within the first location 22 having the largest distance to the centre of the second location 23. The smallest distance $D_{min}$ is preferentially in one embodiment the distance between the centre of the second location 23 and a point at or within the first location 22 having the smallest distance to the centre of the second location 23. The corridor 24 is preferentially determined in one embodiment such that it contains all image points of the target image 21 having a distance to the centre of the second location 23, which is smaller than the largest distance $D_{max}$ multiplied by the sum of one and a predefined width value F (smaller than $D_{max} \cdot (1+F)$) and larger than the smallest distance $D_{min}$ multiplied by the difference between one and the width value F (larger than $D_{min} \cdot (1-F)$).

In step 105, the part of the target image 21 located outside of the corridor 24 is dimmed, in order to focus the attention of a user, like a radiologist, to the corridor 24. Furthermore, in step 105 preferentially in one embodiment the edges of the corridor 24 are displayed within the target image 21 on the display unit 7 by corresponding lines 25, 26.

In another embodiment, the presentation device 4 can comprise a corridor mode, wherein, if in this corridor mode, a marking, like a CAD mark, marking a first location is selected by a user, for example, by using a mouse pointer and a click operation, the corridors are automatically determined and displayed on the corresponding target images. The corridor mode is preferentially activated in one embodiment by pushing a respective button on a graphical user interface on the display unit 7 by using a mouse pointer.

It is also preferred in one embodiment that, if the corridor or the corridors within the at least one target image are currently displayed and if a user corrects in one target image the position of the second location, for example, the position of the nipple, steps 104 and 105 are repeated for this target image in order to automatically update the corridor in this target image depending on the first location within the starting image and the modified position of the second location within this target image.

It is also preferred in one embodiment that, if the corridor or the corridors within the least one target image are currently displayed and if a user corrects in the starting image the first location, steps 104 and 105 are repeated for the at least one target image, in particular, for all target images, in order to automatically update the corridor in the at least one target image, in particular, in all target images, depending on the modified first location within the starting image and the second location within the respective target image.

In one preferred embodiment, in step 105 not only the part of the respective target image located outside of the corridor is dimmed, but also all marks, in particular CAD marks, are, in particular temporarily, turned off, e.g., are not displayed on the display unit 7, preferentially in one embodiment with the exception of the marks, in particular CAD marks, marking the first location in the starting image and the second locations in the starting image and the at least one target image.

If a corridor is displayed on the at least one target image, it is preferred in one embodiment that this corridor can be switched off by clicking again on the first location within the starting image, for example, by clicking again on a mark, in particular, a CAD mark, marking the first location within the starting image.

The presentation device 4 can comprise several modes, for example, a marking mode, in which a user can add markings to the images, and a corridor mode. Preferentially in one embodiment, the corridor mode is de-activated by selecting another mode, for example, by selecting the marking mode. If the corridor mode is switched off, all marking and CAD marks are displayed again on the display unit 7, and no corridor is displayed.

In another embodiment, the distance between the first location and the second location can be entered into the presentation device for presenting an image of an object by a user via an input unit, like a graphical user interface and a mouse and/or a keyboard. This entered distance can a user have been determined from further images of the object preferentially obtained in one embodiment from other medical imaging modalities. This entered distance can be used to determine the corridor in the at least one target image.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single unit or other unit may fulfill the functions of several items recited in the claims.

A computer program may be stored/distributed on a suitable medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

Although some embodiments of the invention use CAD marks, these embodiments are not limited to a certain CAD algorithm, in particular, it is not important for these embodiments how these CAD marks have been determined. These embodiments assume that respective CAD marks are provided by known CAD mark generation units.

U.S. application Ser. No. 11465,078, entitled "METHOD, APPARATUS AND COMPUTER PROGRAM FOR PRESENTING CASES COMPRISING IMAGES," filed concurrently herewith, with inventors Dr. Carl J. G. Evertsz and Dr. Anke Bödicker, assigned to the same assignee as the present application, provides additional disclosure and is incorporated herein by reference in its entirety.

All of the U.S. patents, U.S. patent application publications, U.S. patent applications, foreign patents, foreign patent applications and non-patent publications referred to in this specification and/or listed in the Application Data Sheet are incorporated herein by reference, in their entirety.

What is claimed is:

1. A method in a presentation device for presenting an image of an object on a monitor associated with the presentation device, comprising:
   providing a starting image and at least one target image of said object,
   providing a first location within said starting image,
   providing a second location within said starting image and said at least one target image, being the location of a reference feature detectable in said starting image and in said at least one target image,
   using a control unit of the presentation device, determining a corridor in said at least one target image, wherein said corridor contains a circular line, wherein the circular line defines a circle, whose radius corresponds to a distance between said first location and said second location in said starting image and whose centre position corresponds to said second location,
   presenting said corridor and said at least one target image on the monitor associated with the presentation device.

2. The method as claimed in claim 1, wherein said object is a breast, wherein said starting image and said at least one target image are medical diagnostic images of the breast, in particular, mammograms, wherein said reference feature is a nipple of a breast.

3. The method as claimed in claim 1, wherein providing a first location within said starting image comprises providing an input unit for inputting said first location within said starting image.

4. The method as claimed in claim 1, wherein providing a first location within said starting image comprises providing a CAD mark determined by using a CAD algorithm and providing an input unit for selecting said CAD mark as said first location within said starting image.

5. The method as claimed in claim 1, wherein providing said second location within said starting image and said at least one target image comprises automatically detecting said second location in at least one of said starting image and said at least one target image.

6. The method as claimed in claim 1, wherein providing said second location within said starting image and said at least one target image comprises providing an input unit for inputting said second location within said starting image and said at least one target image.

7. The method as claimed in claim 1, wherein providing said second location within said starting image and said at least one target image comprises providing an input unit for correcting the position of said second location at least within one of said starting image and said at least one target image.

8. The method as claimed in claim 1, further comprising providing an input unit for inputting said distance for providing said distance or determining said distance between said first location and said second location in said starting image.

9. The method as claimed in claim 1, wherein said corridor is determined such that said circular line is located in the middle of said corridor.

10. The method as claimed in claim 1, wherein said first location is extended and wherein determining said corridor comprises:

determining the smallest distance ($D_{min}$) and the largest distance ($D_{max}$) between said second location and said extended first location within said starting image, determining said corridor such that it contains all image points of said at least one target image having a distance to said second location which is smaller than said largest distance ($D_{max}$) and larger than said smallest distance ($D_{min}$).

11. The method as claimed in claim 10, wherein an input unit is provided for inputting a width of said corridor being sufficient to contain all image points of said at least one target image having a distance to said second location which is smaller than said largest distance ($D_{max}$) and larger than said smallest distance ($D_{min}$).

12. The method as claimed in claim 11, wherein an input unit is provided for inputting a width value or wherein a width value is predefined, wherein said corridor is determined such that it contains all image points of said at least one target image having a distance to said second location which is smaller than said largest distance ($D_{max}$) multiplied by the sum of one and the width value and larger than said smallest distance ($D_{min}$) multiplied by the difference between one and the width value.

13. The method as claimed in claim 1, wherein the part of said at least one target image, which is located inside of said corridor, is presented more prominent than the part of said at least one target image which is located outside of said corridor.

14. A presentation device for presenting an image of an object, said presentation device being provided with a starting image and at least one target image of said object, comprising:
a determination unit adapted for
determining a corridor in said at least one target image, wherein said corridor contains a circular line, wherein the circular line defines a circle, whose radius corresponds to a distance between a first location provided within said starting image and a second location provided within said starting image and said at least one target image, wherein said second location is the location of a reference feature detectable in said starting image and in said at least one target image, and whose centre position corresponds to said second location,
a display unit adapted for presenting said corridor and said at least one target image,
wherein the presentation device is adapted for carrying out the presentation method as claimed in claim 1.

15. An imaging system comprising:
an image generation device for generating a starting image and at least one target image of an object,
a presentation device for presenting an image of an object as claimed in claim 14, said presentation device being provided with said starting image and said at least one target image of said object, wherein said imaging system is adapted for:
generating a starting image and at least one target image of an object,
determining a corridor in said at least one target image, wherein said corridor contains a circular line, wherein the circular line defines a circle, whose radius corresponds to a distance between a first location provided within said starting image and a second location provided within said starting image and said at least one target image, wherein said second location is the location of a reference feature detectable in said starting image and in said at least one target image, and whose centre position corresponds to said second location,
presenting said corridor and said at least one target image.

16. A computer-readable storage medium storing a computer program for causing a presentation device to carry out the method as claimed in claim 1 when the computer program is executed on a computer controlling the presentation device the presentation device being provided with a starting image and at least one target image of said object, the presentation device comprising:
a determination unit adapted for determining a corridor in said at least one target image, wherein said corridor contains a circular line, wherein the circular line defines a circle, whose radius corresponds to a distance between a first location provided within said starting image and a second location provided within said starting image and said at least one target image, wherein said second location is the location of a reference feature detectable in said starting image and in said at least one target image, and whose centre position corresponds to said second location; and
a display unit adapted for presenting said corridor and said at least one target image.

* * * * *